United States Patent
Park et al.

(10) Patent No.: US 7,761,494 B2
(45) Date of Patent: Jul. 20, 2010

(54) RECEIVING MODULE AND RECEIVER HAVING THE SAME

(75) Inventors: Sung Kyung Park, Daejeon (KR); Hyun Kyu Yu, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1103 days.

(21) Appl. No.: 11/433,247

(22) Filed: May 13, 2006

(65) Prior Publication Data

US 2007/0055717 A1    Mar. 8, 2007

(30) Foreign Application Priority Data

Sep. 2, 2005    (KR) .................. 10-2005-0081902

(51) Int. Cl.
*G06J 1/00*    (2006.01)
(52) U.S. Cl. ......................................... 708/3
(58) Field of Classification Search ............ 708/3
See application file for complete search history.

(56) References Cited

U.S. PATENT DOCUMENTS 6,070,178 A * 5/2000 Anderson et al. .............. 708/3

FOREIGN PATENT DOCUMENTS

| KR | 1020050004449 | 1/2005 |
| KR | 10-2005 0048423 | 5/2005 |
| WO | WO 02/054692 | 7/2002 |

OTHER PUBLICATIONS

'840 Mb/s CMOS Demultiplexed Equalizing Transceiver for DRAM-to-Processor Communication' Sim et al., 1999 Symposium on VLSI Circuits Digest of Technical Papers, pp. 23-24.
'Partial Response Detection Technique for Driver Power Reduction in High-Speed Memory-to-Processor Communications' Tamura et al., 1997 IEEE International Solid State Circuits Conference/Session 20/Clocking and I/O/Paper SA 20.7, pp. 342-343 & 482.

* cited by examiner

*Primary Examiner*—Tan V Mai
(74) *Attorney, Agent, or Firm*—Ladas & Parry LLP (57) ABSTRACT

Provided are a receiving module and a receiver having the same. The receiving modules includes: a comparing and detecting means for comparing a current bit of a received signal having a continuous waveform to a previous bit thereof and detecting a difference between the current bit and the previous bit; an amplifying means for amplifying the difference detected by the comparing and detecting means; and a sampling means for sampling a waveform of the received signal amplified by the amplifying means to output valid data.

14 Claims, 6 Drawing Sheets

RECEIVING MODULE AND RECEIVER HAVING THE SAME

CROSS-REFERENCE TO RELATED APPLICATION

This application claims priority to and the benefit of Korean Patent Application No. 2005-81902, filed on Sep. 2, 2005, the disclosure of which is incorporated herein by reference in its entirety.

BACKGROUND

1. Field of the Invention

The present invention relates to a receiving module and a receiver having the same and, more particularly, to a receiving module which is applicable to a parallel link operating at a high speed of more than Giga bit per second (Gbps) and is robust against intersymbol interference (ISI), timing jitter, and voltage noise, and a receiver having the same.

2. Discussion of Related Art

As a transmission rate of information bits is increased, chip-to-chip communication is more sensitive to interference, distortion and timing uncertainty.

That is, since a ratio of a timing uncertainty region to a bit time increases at a higher transmission rate, the communication has smaller data eye opening and is more sensitive to intersymbol interference (ISI) and clock jitter.

The intersymbol interference is caused by limited bandwidth of an electrical conductor such as a coaxial cable or a twisted pair cable, and the jitter represents uncertainty or error of a clock cycle which exists unavoidably by thermal noise and power supply noise.

Figure 1:
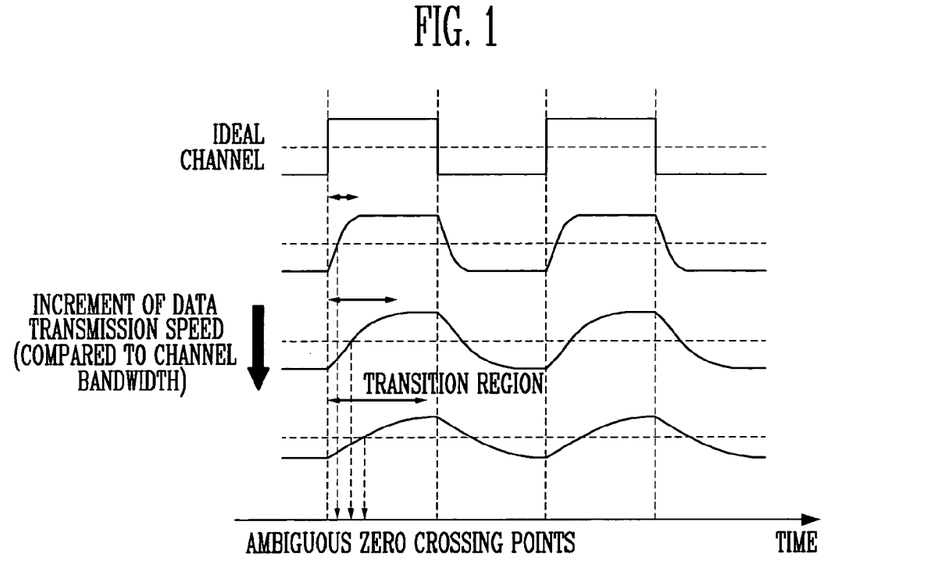
FIG. 1 shows that a zero crossing point of a received waveform becomes more ambiguous and a transition region thereof becomes wider as a data transmission rate increases relative to channel bandwidth.

FIG. 1 shows that a zero crossing point of a received waveform becomes ambiguous and a transition region thereof becomes wider as a data transmission rate increases relative to channel bandwidth.

Referring to FIG. 1, when a square wave stream, i.e., bit stream is transmitted, a waveform of a received signal maintains a square wave "as is" even after the bit stream passes through an ideal channel, i.e., electric conductor.

However, since channels practically have distortion and noise, the waveform of the received signal is in the form of a bit stream having a fluent transition region, not a perfect square wave stream.

Such phenomenon appears to be noticeable at a higher data transmission rate. That is, the transition region is wider, and the zero crossing point is more ambiguous. Thus, it is difficult to properly restore data even with sampling of each bit at its central region.

For the foregoing reason, data may be restored more efficiently by detecting a difference between a previous bit and a current and enlarging the difference instead of sampling it at a predetermined accurate location.

A concept of detecting a difference between the two bits or direction to restore the original signal has been already introduced, and the present invention is focused on a high speed receiver integrated circuit of a new structure capable of efficiently implementing the concept.

With a proper length of approximately tens of meters, it may be more efficient in cost, power consumption, and a board area to transmit a signal via an electric conductor instead of an optical fiber cable.

However, in the case where the electric conductor is employed in a local area network (LAN), a connection of a computer to peripheral devices or the like to transmit a signal at a high speed of more than several Giga bit per second (Gbps), the receiver that is robust against the interference or the timing jitter is required. The use of the receiver which is robust against the interference or the timing jitter reduces a low bit error rate, thereby realizing reliable signal transmission.

SUMMARY OF THE INVENTION

The present invention is directed to a receiving module and a receiver having the same which is low in power consumption, simple to implement, small in area, and insensitive to intersymbol interference and timing jitter in high-speed local area communication using an electric conductor.

One aspect of the present invention is to provide a receiving module including: a comparing and detecting means for comparing a current bit of a received signal having a continuous waveform to a previous bit thereof and detecting a difference between the current bit and the previous bit; an amplifying means for amplifying the difference detected by the comparing and detecting means; and a sampling means for sampling a waveform of the received signal amplified by the amplifying means to output valid data.

The receiving module may further include a bypassing means for bypassing the received signal directly to the sampling means when there is no difference between the previous bit and the current bit.

The bypassing means may include: a switching portion operating in response to a specific clock signal; and a capacitor for storing a waveform of the current bit according to the operation of the switching portion.

The comparing and detecting means may include: a first switching portion operating in response to a first clock signal to sample the previous bit of the received signal; a second switching portion connected in parallel with the first switching portion and operating in response to a second clock signal having a different phase from the first clock signal to compare the current bit to the previously stored previous bit; a capacitor connected in series to the first switching portion to store the signal sampled by the first switching portion; a third switching portion connected in series to the capacitor and operating in response to the second clock signal; and a comparator connected in parallel with the third switching portion to monitor, detect and compare transitions of the previous and current bits of the received signal according to the operation of the third switching portion.

The amplifying means may include: a hysteresis filter for filtering the signal output from the comparing and detecting means to generate a noise-insensitive signal; an amplifier for amplifying the noise-insensitive signal filtered by the hysteresis filter; and an inverter which is controlled by the amplified signal from the amplifier to output a signal output from the hysteresis filter or the amplifier.

Another aspect of the present invention is to provide a receiver including: at least two receiving modules of claim 1 connected in parallel with each other and comparing a current bit of a received input signal to a previous bit thereof and detecting the difference therebetween to restore to an original received signal; and a clock signal generating portion for generating a plurality of multi-phase clock signals and providing each of the receiving modules with the plurality of multi-phase clock signals.

The receiver may include four receiving modules, and each of the receiving modules may be controlled by two multi-phase clock signals being out of phase generated by the clock signal generating portion and one control clock signal generated in each of the receiving modules.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

Figure 2:
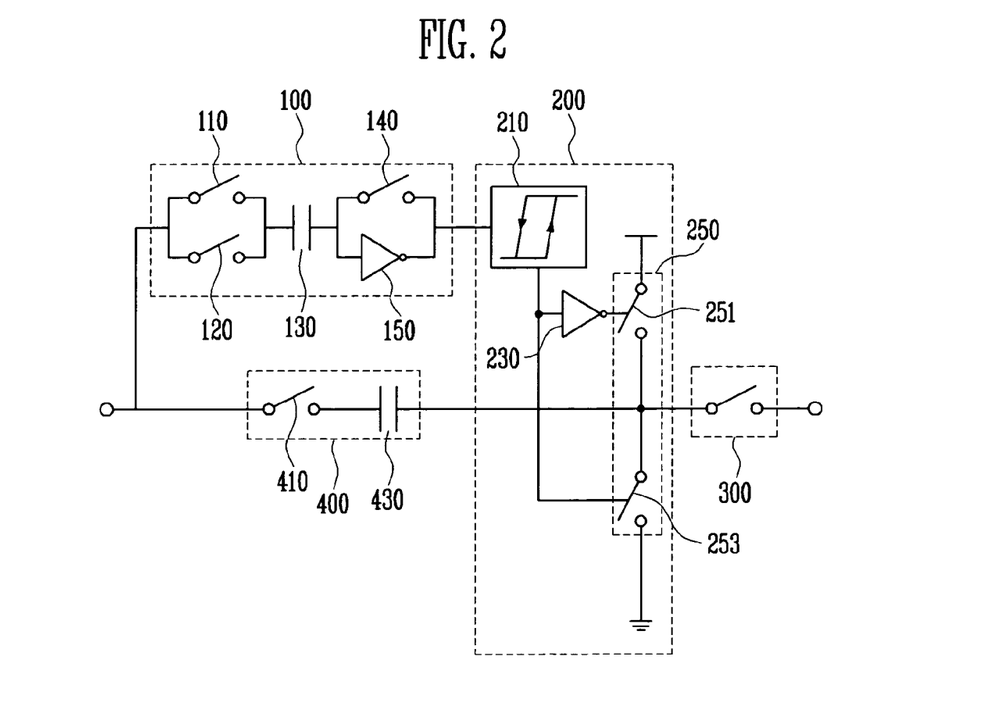
FIG. 2 is a circuit diagram of a receiving module according to an exemplary embodiment of the present invention.

FIG. 2 is a circuit diagram of a receiving module according to an embodiment of the present invention.

Referring to FIG. 2, the receiving module comprises a comparing and detecting portion 100, an amplifying portion 200, and a sampling portion 300.

The comparing and detecting portion 100 functions to compare a current bit of a received signal having a continuous waveform to a previous bit thereof and detect a difference therebetween.

The comparing and detecting portion 100 comprises a first switch 110 for sampling the previous bit of the received signal in response to a first clock signal CK1, a second switch 120 connected in parallel with the first switch 110 to compare a current bit of the received signal to the previous bit previously stored in response to a second clock signal CK2, a first capacitor 130 connected in series to the first switch 110 to store the sampled signal generated by the first switch 110, a third switch 140 connected in series to the first capacitor 130 and operating in response to the second clock signal CK2, and a comparator 150 connected in parallel with the third switch 140 to monitor, detect, and compare transitions of the previous and current bits of the received signal according to the operation of the third switch 140.

Preferably, the first and second clock signals are (90° or ¼ cycle) out of phase.

The amplifying portion 200 amplifies the difference detected by the comparing and detecting portion 100. The amplifying portion 200 comprises a hysteresis filter 210 for filtering the signal output from the comparing and detecting portion to generate a noise-insensitive signal, an amplifier 230 for amplifying the noise-insensitive signal filtered by the hysteresis filter 210, and an inverter 250 which is controlled by the amplified signal from the amplifier 230 to output the signal output from the hysteresis filter 210 or the amplifier 230. Preferably, the inverter 250 may include fourth and fifth switches 251 and 252, which are connected in series to each other.

The sampling portion 300 functions to sample the waveform of the signal amplified by the amplifier 200 to output valid data. Preferably, the sampling portion 300 is implemented by a typical switch.

The receiving module of the present invention may further comprise a bypassing portion 400 for passing the received input signal or bypassing the received input signal directly to the sampling portion 300 when there is no difference between the previous and current bits of the received signal.

The bypassing portion 400 comprises a sixth switch 410 operating in response to a third clock signal CK3 and a second capacitor 430 for storing a waveform of the current bit according to operation of the sixth switch 410. Here, the third clock signal CK3 preferably is a clock signal obtained by transitioning the first clock signal CK1 by 90° in phase.

Operation of the receiving module having the above-described configuration according to an embodiment of the present invention will be described in detail.

Figure 3:
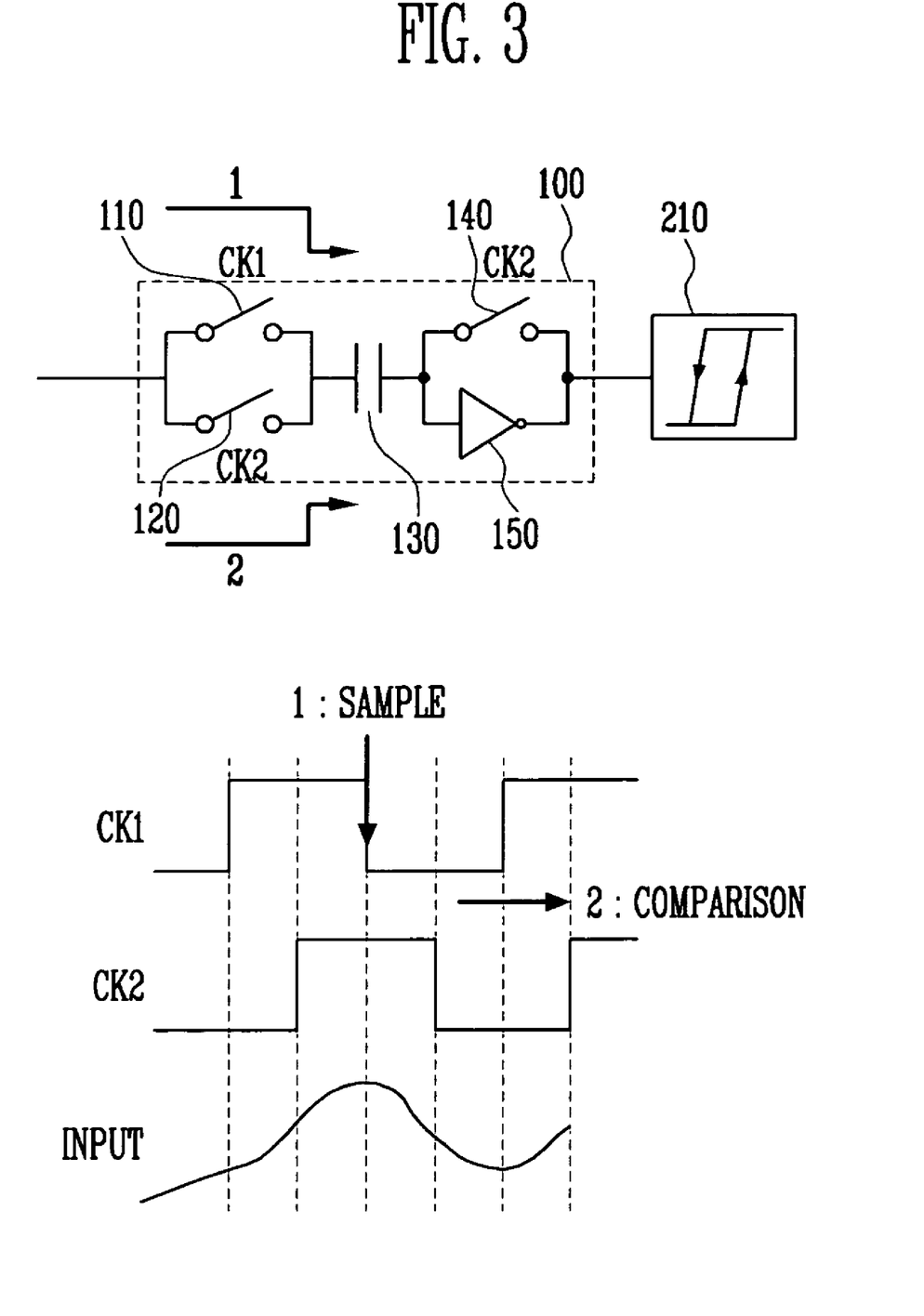
FIG. 3 shows operation of a comparing and detecting portion of FIG. 2.
Figure 4:
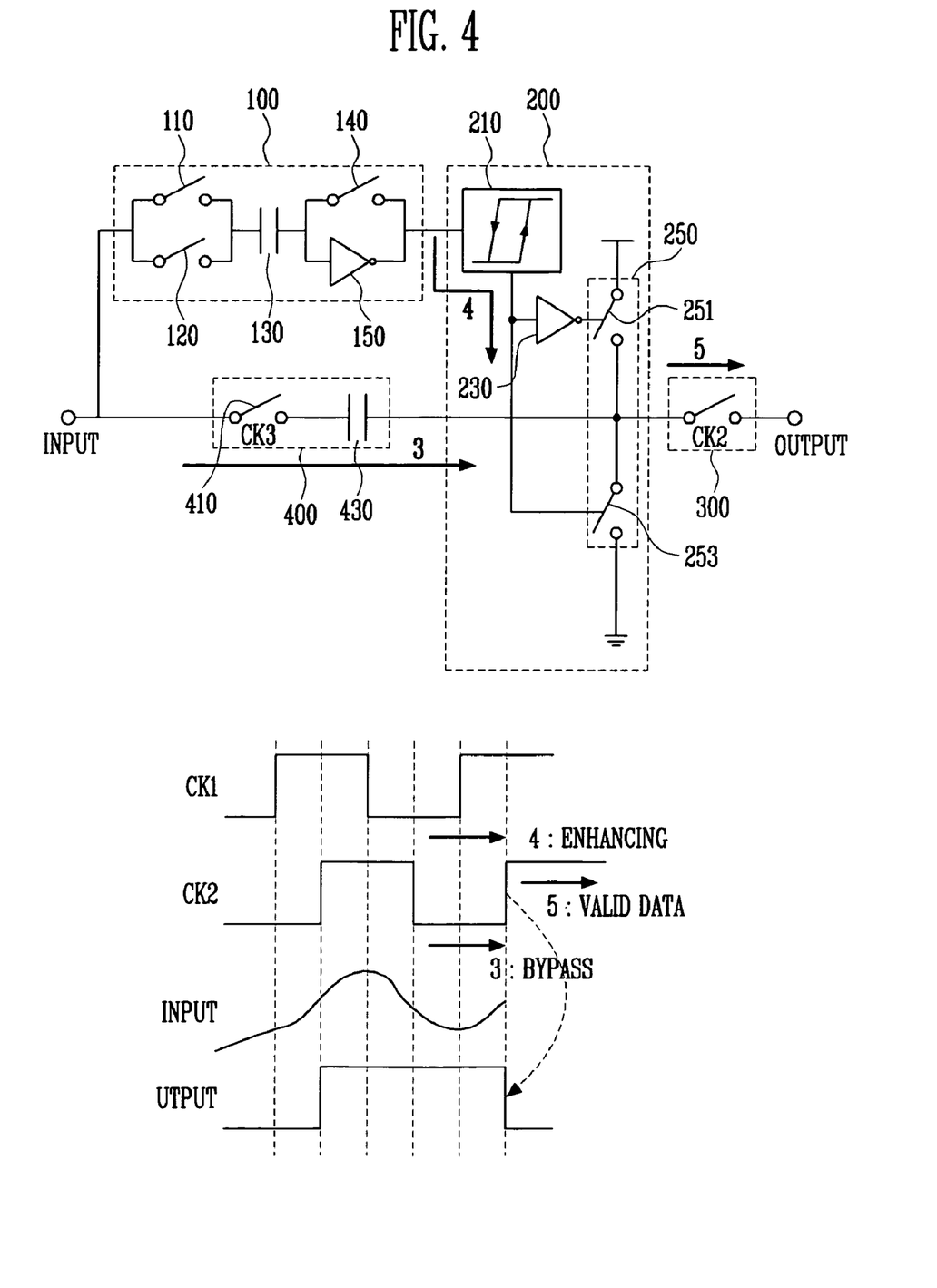
FIG. 4 shows operation of an amplifying portion and a bypassing portion.

FIG. 3 shows operation of the comparing and detecting portion of FIG. 2, and FIG. 4 shows operation of the amplifying portion and the bypassing portion. The receiving module of the present invention operates to efficiently restore data. The data restoration has two modes of operation: a process for detecting a difference or transition between the previous bit and the current bit, and a process for signal-enhancing the detected waveform.

Referring to FIGS. 3 and 4, the first and second switches 110 and 120 of the comparing and detecting portion 100 operate in response to the first and second clock signals CK1 and CK2, respectively. The first and second switches 110 and 120 are closed when the first and second clock signals CK1 and CK2 are at a high level, and are opened when the first and second clock signals CK1 and CK2 are at a low level.

The received signal input to the comparing and detecting portion 100 exhibits a waveform having a slew rate fluent due to for example channel distortion. The bit stream of the received data has an ambiguous zero crossing point and an increased transition region where a transition from 0 to 1 or from 1 to 0 occurs.

The first switch 110 samples the previous bit at an edge on which the first clock signal CK1 transitions from a high level to a low level, and the sample of the previous bit is stored in the first capacitor 130.

The second switch 120 begins to compare the current bit to the previous bit previously stored at an edge on which the second clock signal CK2 transitions from a high level to a low level. The comparison process is continuously performed while the second clock signal CK2 is at a low level, thereby averaging the data.

The comparator 150 is a typical inverter and performs auto-zeroing operation using the third switch 140 at a high level of the second clock signal CK2, to thereby make the input/output signals of the comparator 150 identical and monitor, detect and compare transitions of the two continuous bits at a low level of the second clock signal CK2.

A difference value between the two bits detected by the comparator 150 is changed to the noise-insensitive signal while passing through the hysteresis filter 210.

The signal transition is detected by the procedure of FIG. 3, but the received input signal is transferred to the sampling portion 300 as shown in FIG. 4 when there is no signal transition.

When there is no difference between the previous bit and the current bit, the waveform of the current bit is stored in the second capacitor 430 by the sixth switch 410 of the bypassing portion 400 at a low level of the second clock signal CK2.

Here, the second switch 410 operates in response to the third clock signal CK3 in the same phase with the second clock signal CK2.

As described above, while the second clock signal CK2 is at a low level, the difference between the two bits detected by the comparing and detecting portion 100 is signal-enhanced by the amplifying portion 200 and then output to the sampling portion 300. The final output as the valid data is transferred from the sampling portion 300 when the second clock signal CK2 is at a high level.

In the inverter 250 of the amplifying portion 200, when the signal amplified by the amplifier 230 is at a high level, the fourth and fifth switches 251 and 253 are respectively turned on and off, so that the signal is output from the amplifier 230 to the sampling portion 300. On the other hand, when the signal amplified by the amplifier 230 is at a low level, the fourth and fifth switches 251 and 253 are respectively turned off and on, so that the signal filtered by the hysteresis filter 210 is output to the sampling portion 300.

Figure 5:
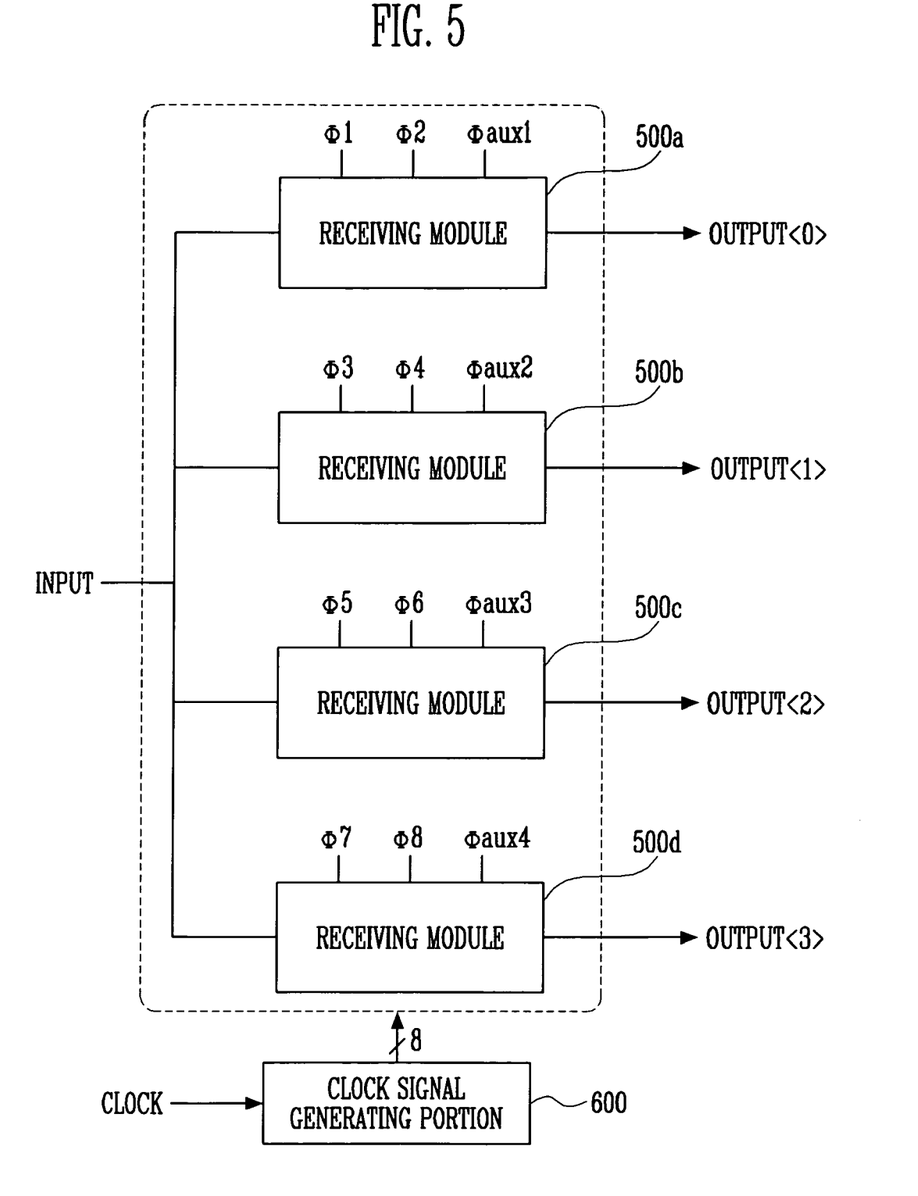
FIG. 5 is a block diagram of a receiver having the receiving module according to an exemplary embodiment of the present invention.

FIG. 5 is a block diagram illustrating a receiver having the receiving module according to an embodiment of the present invention.

Referring to FIG. 5, the receiver of the present invention comprises four receiving modules 500a to 500d connected in parallel with each other to improve an operating speed, and a clock signal generating portion 600 for generating a plurality of multi-phase clock signals $\Phi 1$ to $\Phi 8$ and providing the receiving modules 500a to 500d with them.

Each of the receiving modules 500a to 500d compares the current bit of the received signal to the previous bit, detects the difference therebetween and restores the received signal to the original signal. The module has substantially the same configuration, operation and effect as those of the previously-described receiving module (FIG. 2) according to the embodiment of the present invention. Accordingly, description thereof will be made with reference to FIG. 2.

The receiving modules 500a to 500d can generate first to fourth control clock signals $\Phi aux1$ to $\Phi aux4$ by using the multi-phase clock signals $\Phi 1$ to $\Phi 8$ generated by the clock signal generating portion 600 and, for example, an NAND/NOR gate.

In this embodiment, the clock signal generating portion 600 generates the multi-phase clock signals $\Phi 1$ to $\Phi 8$ having 8 constant phases and provides the two signals to each of the receiving modules 500a to 500d. The clock signal generating portion 600 is preferably implemented by a phase-locked loop (PLL) or a delay-clocked loop (DLL).

A frequency of the multi-phase clock signals $\Phi 1$ to $\Phi 8$ is a quarter (¼) of the bit rate, and the two multi-phase clock signals $\Phi 1$ and $\Phi 2$, $\Phi 3$ and $\Phi 4$, $\Phi 5$ and $\Phi 6$, and $\Phi 7$ and $\Phi 8$ provided to each of the receiving modules 500a to 500d are 45° out of phase, respectively.

The receiver of FIG. 4 is implemented by quadruple-interleaving the four receiving modules 500a to 500d in order to improve the operating speed, but may be implemented by using two or more receiving modules.

Operations of a receiver having the above-described receiving modules according to an embodiment of the present invention will be described in detail.

Figure 6:
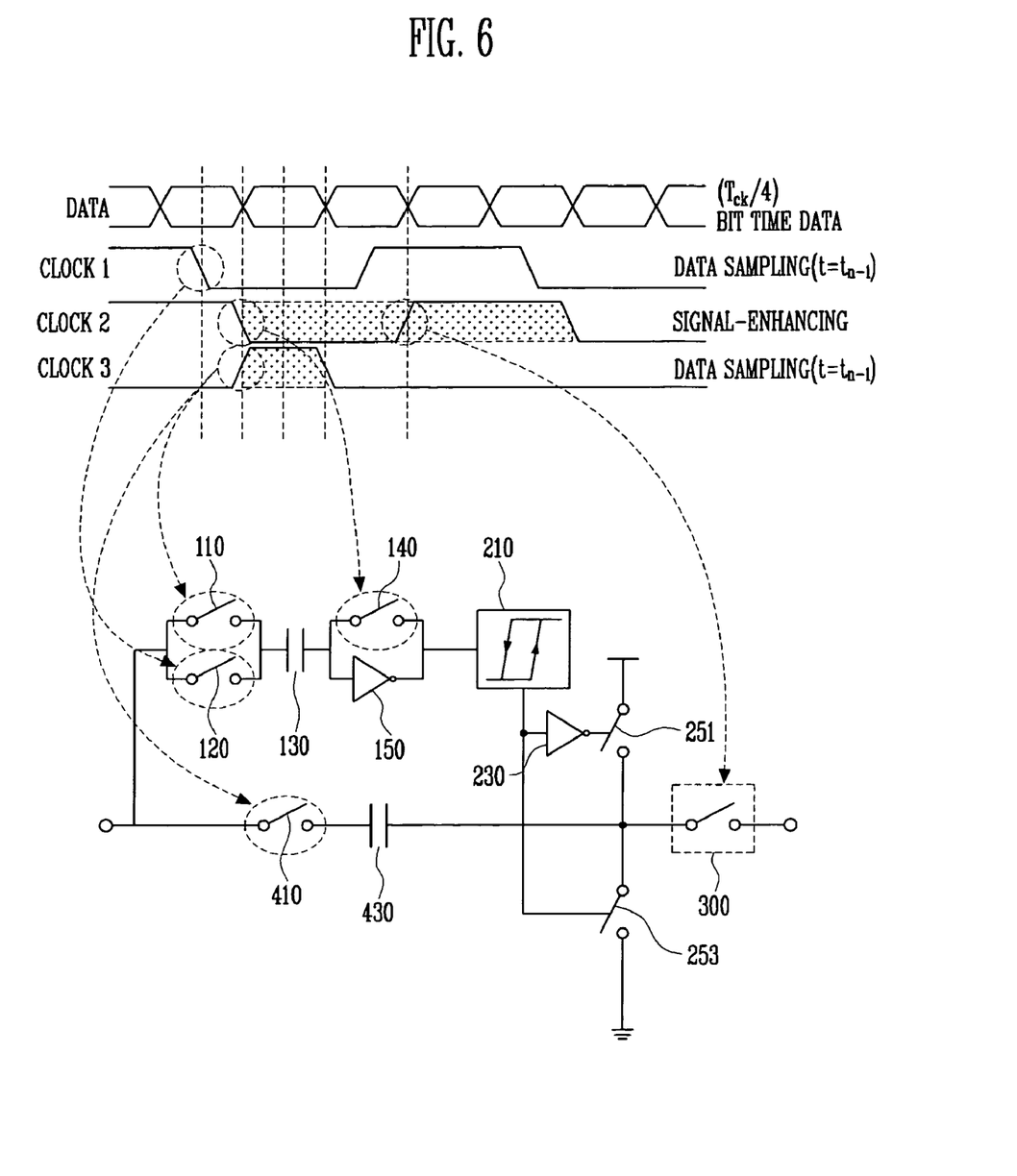
FIG. 6 is a timing diagram illustrating operation of the receiver having the receiving module according to an exemplary embodiment of the present invention.

FIG. 6 is a timing diagram illustrating operation of the receiver having the receiving module according to the embodiment of the present invention. In particular, FIG. 6 is a timing diagram with respect to one receiving module 500a. The other receiving modules 500b to 500d perform the same operation as the receiving module 500a in the timing diagram of FIG. 6.

In FIG. 6, the multi-phase clock signals $\Phi 1$ and $\Phi 2$ input to the receiving module 500a is 45° out of phase and correspond to a clock 1 and a clock 2, and the first control clock signal $\Phi aux1$ generated in the receiving module 500a corresponds to a clock 3.

Here, the first control clock signal $\Phi aux1$ preferably has a shorter pulse width than that of the multi-phase clock signal $\Phi 2$.

The clock 1 controls the second switch 120, and the clock 3 controls the first and sixth switches 110 and 410. A falling edge of the clock 2 on which a transition from a high level to a low level occurs controls the third switch 140, and a rising edge of the clock 2 on which a transition from a low level to a high level occurs controls the sampling portion 300.

The previous bit (bit at a time $t_{n-1}$) is sampled at the falling edge of the clock 1, and the current bit (bit at a time $t_n$) is sampled during a high level of the clock 3.

Comparison of the current bit to the previous bit is performed during a high level of the clock 3, that is, the difference between the previous bit and the current bit is detected during a high level of the clock 3, and the detected difference value is signal-enhanced during a low level of the clock 2.

The valid output data is transferred to the next stage by the sampling portion 300 while the clock 2 is at a high level. Since a bit time or bit duration is doubled at a low level of the clock 2, timing margin is sufficient, leading to sufficient signal enhancement. That is, it is possible for the receiver using the quadruple-interleaving method according to the embodiment of the present invention to operate at a high speed.

Figure 7:
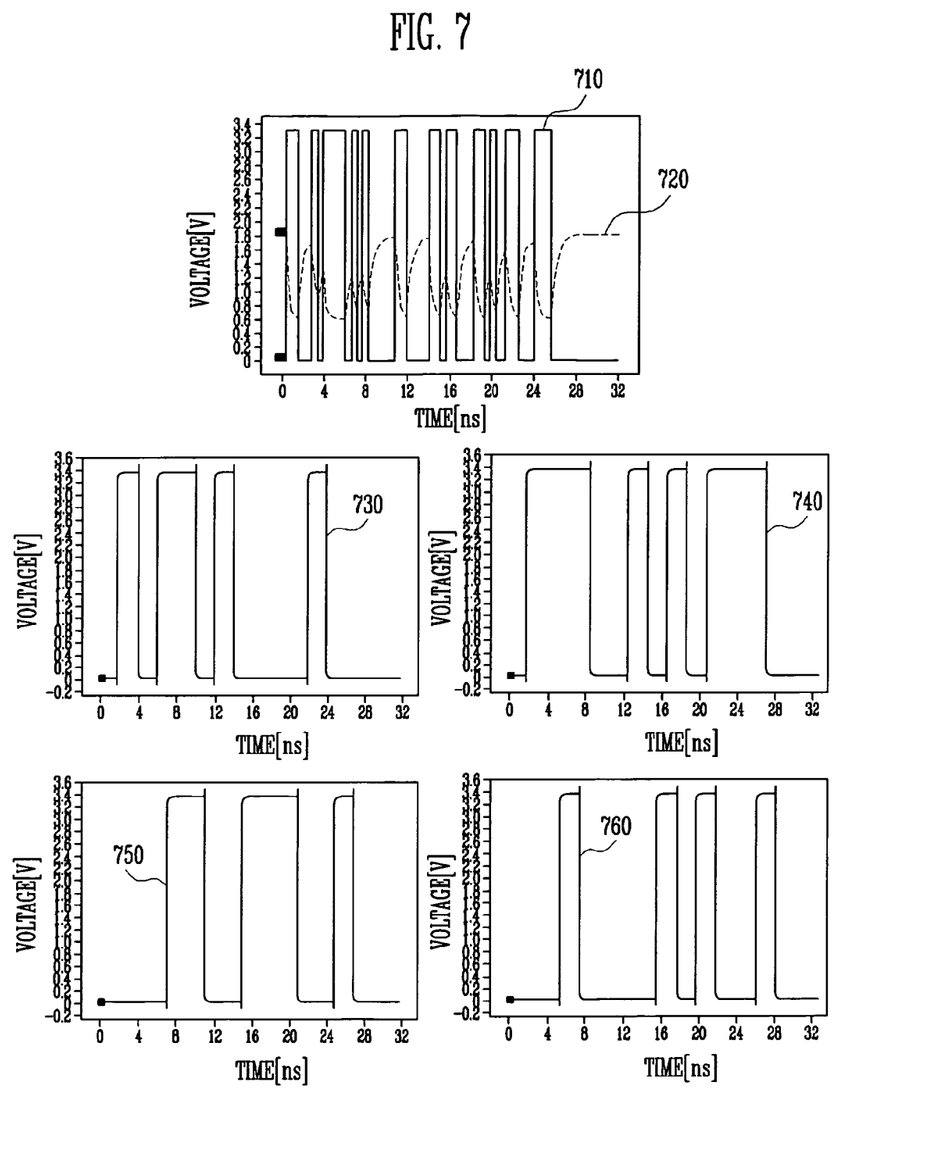
FIG. 7 shows graphs illustrating data restoration operation of the receiver having the receiving module according to the present invention.

FIG. 7 shows graphs illustrating data restoration operation of the receiver having a receiving module according to an embodiment of the present invention.

In FIG. 7, it is assumed that a data transmission rate is 2 Gbps, and a stream of a transmitted signal is "11000101111010100000110000110110001101001100011 1000." A bit stream 710 represents the waveform of the transmitted signal.

The waveform of the transmitted signal undergoes channel distortion and then becomes a distorted waveform 720. The distorted waveform is input to the receiver of the present invention. The receiver properly operates to output first to fourth bit streams 730 to 760 through the receiving modules 500a to 500d.

The first bit stream 730 is an output of the receiving module 500a, the second bit stream 740 is an output of the receiving module 500b, the third bit stream 750 is an output of the receiving module 500c, and the fourth bit stream 760 is an output of the receiving module 500d.

A desired output sequentially comes from the first to fourth bit streams 730 to 760 and sequentially comes from the first to fourth bit streams 730 to 760 again. It can be seen that the stream of the transmitted signal is accurately restored from the first to fourth bit streams 730 to 760 at the output of the receiver.

As described above, the receiving module and the receiver having the same according to the present invention compare the current bit of the received input signal to the previous bit and detect the difference therebetween, instead of sampling the absolute value of the waveform of the received signal at a predetermined location, to restore the received signal to the original signal, whereby it is easily applied to the parallel link which operates at a high speed of Gbps, and it is robust against intersymbol interference, timing jitter and voltage noise.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A receiving module, comprising:
   a comparing and detecting means for comparing a current bit of a received signal having a continuous waveform to a previous bit thereof and detecting a difference between the current bit and the previous bit;
   an amplifying means for amplifying the difference detected by the comparing and detecting means;
   a sampling means for sampling a waveform of the received signal amplified by the amplifying means to output valid data; and
   a bypassing means for bypassing the received signal directly to the sampling means when there is no difference between the previous bit and the current bit.

2. The receiving module of claim 1, wherein the bypassing means comprises:
   a switching portion operating in response to a specific clock signal; and
   a capacitor for storing a waveform of the current bit according to the operation of the switching portion.

3. The receiving module of claim 1, wherein the comparing and detecting means comprises:
   a first switching portion operating in response to a first clock signal to sample the previous bit of the received signal;
   a second switching portion connected in parallel with the first switching portion and operating in response to a second clock signal having a different phase from the first clock signal to compare the current bit to the previously stored previous bit;
   a capacitor connected in series to the first switching portion to store the signal sampled by the first switching portion;
   a third switching portion connected in series to the capacitor and operating in response to the second clock signal; and
   a comparator connected in parallel with the third switching portion to monitor, detect and compare transitions of the previous and current bits of the received signal according to the operation of the third switching portion.

4. The receiving module of claim 3, wherein the first and second clock signals are 90° or ¼ cycle out of phase.

5. The receiving module of claim 3, wherein the sampling operation of the first switching is performed at a falling edge of the first clock signal on which a transition from a high level to a low level occurs, the comparison operation of the second switching portion begins from a falling edge of the second clock signal on which a transition from a high level to a low level occurs and is continuously performed while the second clock signal is at a low level, and the comparator monitors, detects and compares transitions of the previous and current bits of the received signal using the third switching portion during a low level of the second clock signal.

6. The receiving module of claim 1, wherein the amplifying means comprises:
   a hysteresis filter for filtering the signal output from the comparing and detecting means to generate a noise-insensitive signal;
   an amplifier for amplifying the noise-insensitive signal filtered by the hysteresis filter; and
   an inverter which is controlled by the amplified signal from the amplifier to output a signal output from the hysteresis filter or the amplifier.

7. The receiving module of claim 6, wherein the inverter comprises first and second switching portions connected in series to each other,
   wherein the first and second switching portions are respectively turned on and off to output the signal output by the amplifying portion when the signal amplified by the amplifier is at a high level, and the first and second are respectively turned off and on to output the signal filtered by the hysteresis filter when the signal amplified by the amplifier is at a low level.

8. The receiving module of claim 1, wherein the sampling means comprises a switch which operates in response to a specific clock signal and outputs the valid data when the specific clock signal is at a high level.

9. A receiver, comprising:
   at least two receiving modules of claim 1 connected in parallel with each other and comparing a current bit of a received input signal to a previous bit thereof and detecting the difference therebetween to restore to an original received signal; and
   a clock signal generating portion for generating a plurality of multi-phase clock signals and providing each of the receiving modules with the plurality of multi-phase clock signals.

10. The receiver of claim 9, wherein the receiver comprises four receiving modules, and each of the receiving modules is controlled by two multi-phase clock signals being out of phase generated by the clock signal generating portion and one control clock signal generated in each of the receiving modules.

11. The receiver of claim 10, wherein the one control clock signal generated in each of the receiving modules is generated by the two multi-phase clock signals being out of phase and an NAND/NOR gate.

12. The receiver of claim 10,
   wherein the two multi-phase clock signals provided to each of the receiving modules comprise a first multi-phase clock signal for controlling operation to sample the previous bit of the received input signal, and a second multi-phase clock signal for controlling operation to amplify the difference between the previous bit and the current bit, and
   wherein the one control clock signal generated in each of the receiving modules has a different form from the first and second multi-phase clock signals and controls operation to sample the current bit of the received input bit.

13. The receiver of claim 12, wherein the first and second multi-phase clock signals are 45° out of phase, and the one control clock signal has a shorter pulse width than that of the second multi-phase clock signal.

14. The receiver of claim 12, wherein the previous bit is sampled at a falling edge of the first multi-phase clock signal on which a transition from a high level to a low level occurs, the difference between the previous bit and the current bit is amplified during a low level of the second multi-phase clock signal, and the current bit is sampled during a high level of the one control clock signal generated in each of the receiving modules.

* * * * *